W. H. LOGAN.
REVOLVING TABLE.
APPLICATION FILED MAY 3, 1916.
1,224,475.
Patented May 1, 1917.
2 SHEETS—SHEET 1.
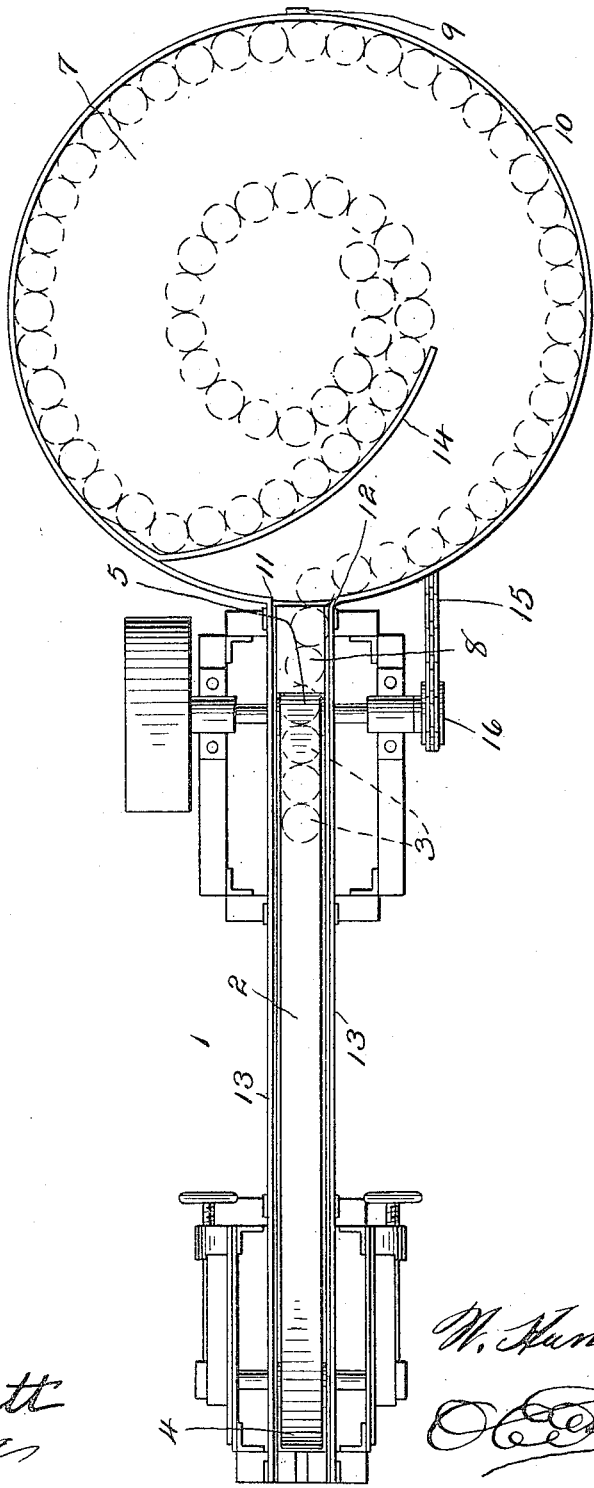
Fig. A.
Witnesses
T. P. Britt
A. L. Rose
Inventor
W. Hume Logan
O. E. Duffy & Son
Attorneys

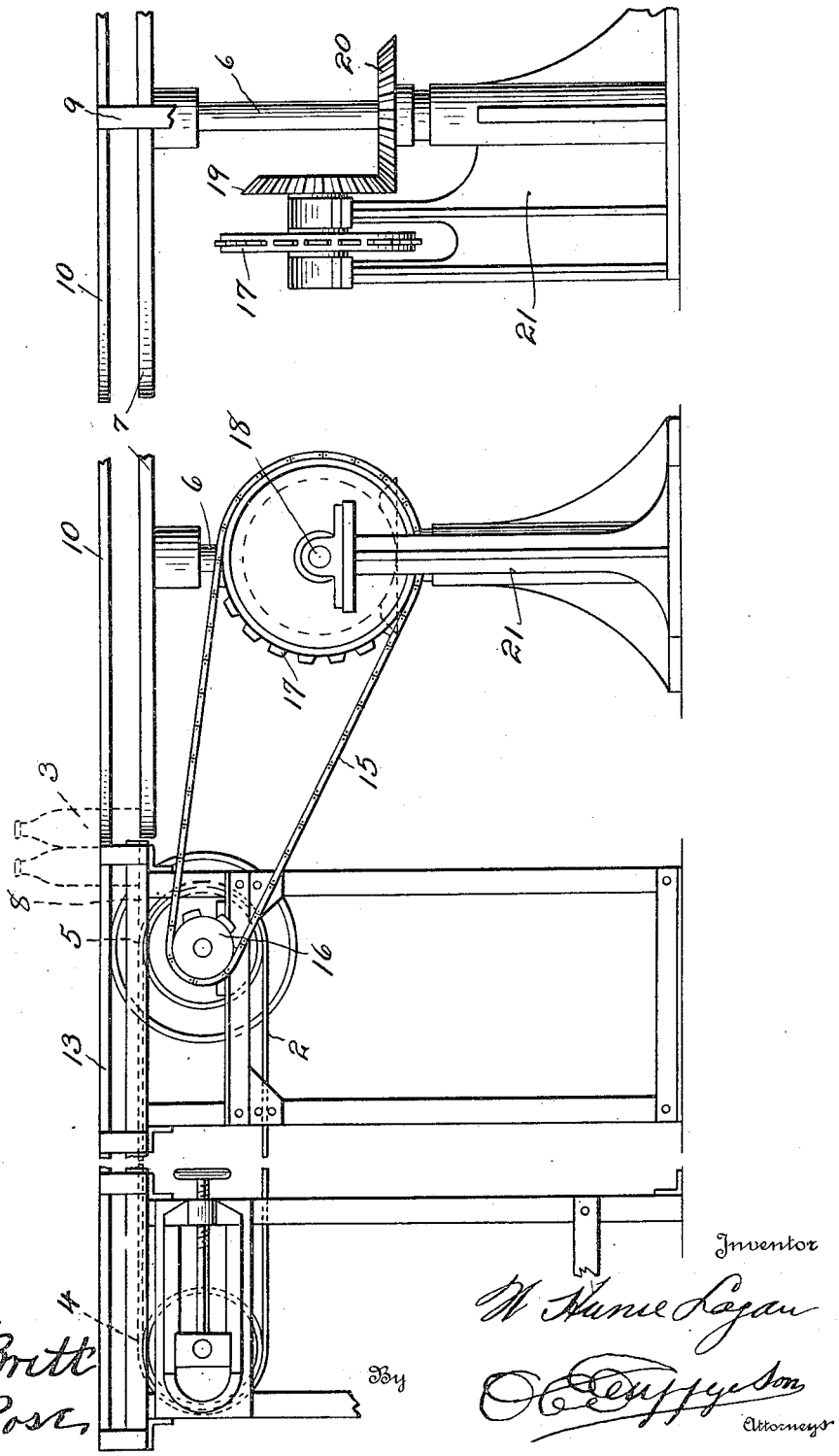

UNITED STATES PATENT OFFICE.

WILLIAM HUME LOGAN, OF LOUISVILLE, KENTUCKY, ASSIGNOR TO DOW WIRE & IRON WORKS, OF LOUISVILLE, KENTUCKY, A CORPORATION.

REVOLVING TABLE.

1,224,475. Specification of Letters Patent. Patented May 1, 1917.

Application filed May 3, 1916. Serial No. 95,242.

*To all whom it may concern:*

Be it known that I, WILLIAM HUME LOGAN, a citizen of the United States, residing at Louisville, in the county of Jefferson and State of Kentucky, have invented certain new and useful Improvements in Revolving Tables; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a revolving table and conveyer and has for its object to provide a novel and useful arrangement to be employed in the packing of bottles or the like.

In boxing bottles or the like, it is usual to convey the same to the point where the packing is effected by means of the conveyer. It frequently happens that the packer or packers receive the bottles or the like faster than they can be removed from the conveyer, thus congesting the conveyer and delaying the work. This invention has for its object to provide a revolving table and novel guiding device which receives the bottles from the conveyer and leads same to the center of the table so as to accumulate the bottles on the table, thus allowing the conveyer to continue in operation and giving the packer or packers time to catch up should by any reason they have been unable to remove the bottles as fast as the conveyer delivers them. The invention therefore consists in the novel construction and arrangement of the parts, as will be first fully described and afterward specifically pointed out in the appended claim.

Referring to the accompanying drawings:

Figure 1 is a top plan view of the device.

Fig. 2 is a fragmentary side elevation and

Fig. 3 is a fragmentary end elevation of the revolving table and its driving mechanism.

Like numerals of reference indicate the same parts throughout the several figures, in which: 1 indicates the device which includes the endless conveyer 2 of any design or construction, by means of which the bottles or the like 3 are conveyed from the end 4 to the end 5.

Vertically mounted on a rotatable shaft 6 adjacent the end 5 of the conveyer 2 is a revolving table 7, the periphery of which approaches the conveyer 2, the intervening space being filled by a flat plate 8 in plane with the conveyer 2 and the top surface of the table 7.

Suitably supported as by a support 9 is an annular guide rail 10 positioned above the table 7, and following its periphery, said guide rail 10 being connected at 11 and 12 to the rails 13 of the conveyer. It will be noted that the annular guide rail 10 is slightly curved at the point 12 so as to allow an easy entrance of the bottles or the like upon the table 7.

Adjacent the point 11 and extending across the table 7 in a curved line is a guide rail 14 which receives the bottles or the like from the annular guide rail 10 and leads them in a curved direction toward the center of the table 7, so that the bottles or the like will accumulate at the center of the table 7 and in the regular order in which they will be delivered from the conveyer, otherwise the bottles or the like would be conglomerated on the table in disorder and breakage might result.

It will be noted that the guide rail 14 is secured at one end only and that end to the annular guide rail 10. The curved guide rail 14 has, therefore, a free end, while the body of the rail being also unhampered permits of a yielding or flexing of the rail with respect to the annular guide rail 10 and the revolving table 7, in such manner that the said curved rail 14 will yield to the pressure of the bottles coming in contact therewith, so as to insure the guiding or positioning of the bottles upon the revolving table 7 in a safe and in an efficient manner.

The revolving table is driven by a chain 15 passing from the conveyer drum sprocket 16 to a sprocket 17 and shaft 18 carrying a bevel gear 19 meshing with a bevel gear 20 fast on the vertical table shaft 6, the said shaft and gearing being mounted on a base 21.

Having thus fully described the several parts of the invention, its operation is apparent from the foregoing taken in connection with the accompanying drawings.

What I claim as new and desire to secure by Letters Patent of the United States is:

The combination with a conveyer of a revolving table, an annular guide rail positioned above said table, a further guide rail having one end thereof secured to said annular guide rail, the body portion and free end of said further guide rail extending over the said revolving table in a curved direction, the free end of the curved guide rail terminating adjacent the center of the revolving table to receive and lead articles from said annular guide rail toward the center of the revolving table in regular order, and means for driving the revolving table, the body portion and free end of the said curved guide rail being adapted to yield to the pressure of articles thereagainst in such manner as to guide articles toward the center of the revolving table in a safe and in an efficient manner.

In testimony whereof, I affix my signature, in presence of two witnesses.

W. HUME LOGAN.

Witnesses:
BENTLEY RUDD,
H. D. POTTER.

Copies of this patent may be obtained for five cents each, by addressing the "Commissioner of Patents, Washington, D. C."